Figure 1:
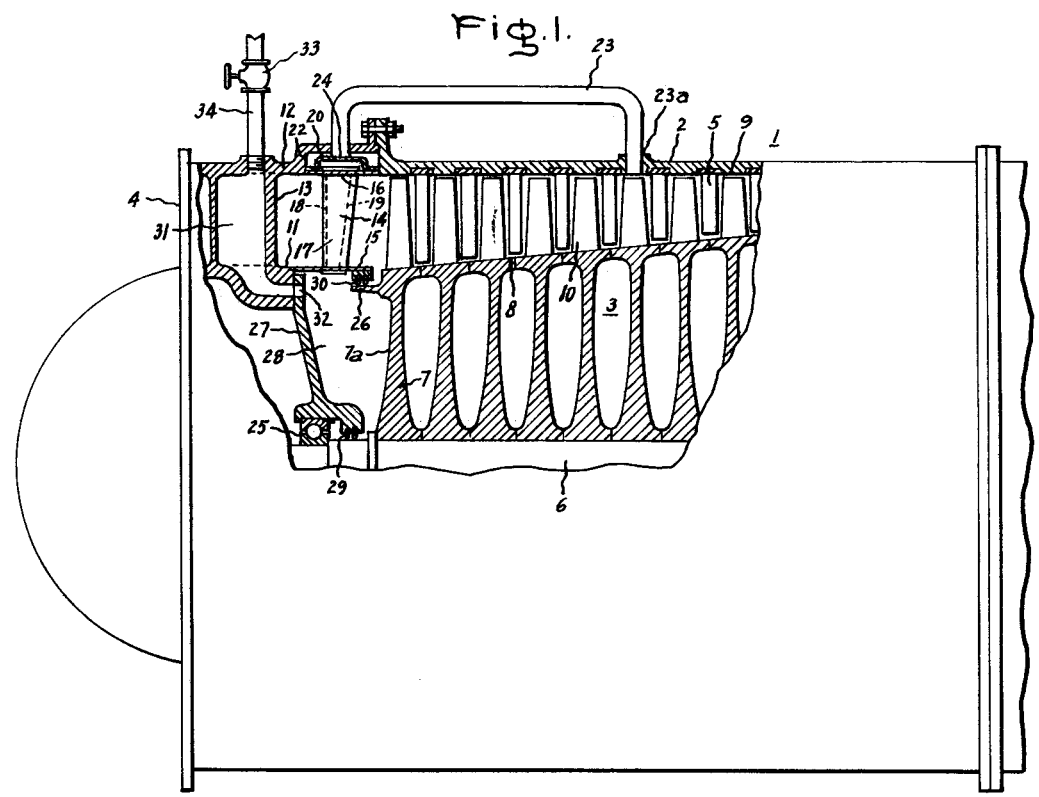

Inventor:
Neil Burgess,
by  Ernest C. Britton
His Attorney.

United States Patent Office 2,718,350
Patented Sept. 20, 1955

2,718,350

DE-ICING APPARATUS FOR COMPRESSORS

Neil Burgess, Melrose, Mass., assignor to General Electric Company, a corporation of New York Application December 20, 1949, Serial No. 134,024

7 Claims. (Cl. 230—122)

This invention relates to gas turbine power plants, and more particularly to means for preventing ice accumulation in the inlet passage of such power plants.

A gas turbine power plant for the propulsion of aircraft may comprise an axial flow compressor and combustion apparatus utilizing compressed air supplied thereto by the compressor to provide gases under pressure and at elevated temperature for driving the turbine-compressor combination, and a nozzle utilizing gases leaving the turbine to form a propulsion jet. The details of such a power plant are described with greater particularity in a copending application of Alan Howard, Serial No. 541,565, filed June 22, 1944, now Patent No. 2,711,074, dated June 21, 1955, and assigned to the assignee of the present application.

In the operation of such a power plant, it is desirable in the interest of good efficiency to provide a plurality of guide vanes in the inlet passage to direct the entering air to the compressor rotor at the correct angle. If the power plant is operated under adverse atmospheric conditions there may be considerable tendency for ice to form and accumulate on the guide vanes. If any appreciable quantity of ice accumulates on the guide vanes, the compressor inlet cross-sectional area is reduced, thus reducing the quantity of air flowing through the power plant. A reduction in the air flow will decrease the thrust or power output of the power plant, and since a reduced quantity of air is flowing through the combustion apparatus, the temperature in the combustion, turbine, and exhaust sections of the power plant may appreciably exceed their normal operating values with resultant damage to the power plant.

A second problem in connection with the operation of power plants of the type described is in the somewhat unrelated problem of balancing axial forces on the compressor rotor in order to minimize bearing loads. In power plants of this type it is often desirable to provide at least one thrust balancing piston as part of the compressor rotor structure and to direct fluid pressure against the piston to obtain a balancing force in opposition to said axial forces. Particularly in aircraft service where weight considerations are of the utmost importance, it is extremely desirable to construct the wheels or blade carrying discs at the low pressure end of the compressor rotor of a light weight, non-ferrous material, such as magnesium or aluminum. For the same reason it is desirable to obtain the pressurized fluid for the force balancing system from the compressor itself, and thus it is desirable to connect the balancing piston to a point of suitable pressure in the compressor flow system. This practice is subject to the disadvantage, however, that non-ferrous metals of the type described have relatively little structural strength at temperatures exceeding 200° Fahrenheit, and since the temperature of the compressed fluid may easily exceed this value following compression, the rotor structure must be made heavier than would otherwise be necessary, or means for cooling the pressurized fluid supplied to the balance piston must be provided.

Accordingly, it is an object of the invention to provide improved means for preventing ice formation at the compressor inlet and at the same time for cooling fluid supplied to the compressor balance piston.

Another object of the invention is to provide improved means for de-icing the compressor inlet guide vanes of an aircraft power plant.

Still another object is in the provision of means for preventing ice accumulation at the inlet of an aircraft power plant and for supplying cooled fluid for balancing axial forces acting on the rotor in such a power plant without incurring losses in the performance thereof.

Another object is in the provision of improved means for balancing axial forces on the rotor of an aircraft power plant without material increase in the weight of the power plant and without requiring special heat exchange apparatus.

Figure 2:
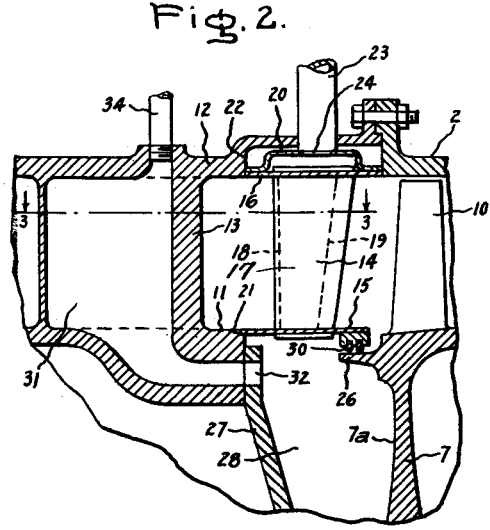

Other objects and advantages will be apparent from the following description taken in connection with the accompanying drawings, in which Fig. 1 is a diagrammatic view, partly in section, of a compressor portion of an aircraft power plant illustrating one embodiment of the invention; Fig. 2 is an enlarged sectional view of a portion of the compressor inlet passage shown in Fig. 1; and Fig. 3 is a partial sectional view, taken on line 3—3 of Fig. 2 looking in the direction indicated by the arrows, showing the inlet guide vanes and a support strut.

Figure 3:
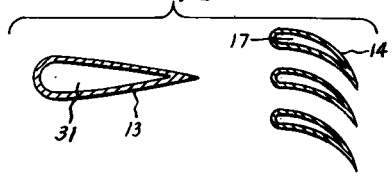

Referring now to Figs. 1–3, a compressor section of a gas turbine power plant is indicated generally at 1. As previously indicated, a gas turbine power plant for the propulsion of aircraft may also include a combustion section, a turbine section, and a propulsion nozzle. However, none of these components are essential to an understanding of the present invention and therefore are not shown. The compressor section 1 comprises a stator 2, a rotor 3, and an inlet 4. A plurality of axially spaced rows of stationary blades 5 are secured to the stator, as indicated in the drawing. Rotor 3 comprises a shaft 6 on which are secured a plurality of wheel or disc members. Each of discs 7 is in contact with an adjacent disc at the periphery thereof to form a substantially continuous surface 8. An inner surface 9 of stator 2 and surface 8 are coaxial and in spaced relation to define an annular flow passage through the compressor. Separate rows of moving blades 10 are secured to each of the peripheral portions of discs 7 and, as indicated in the drawing, the separate rows of moving blades 10 are disposed between adjacent rows of stator blades 5. Axially extending walls 11, 12 are secured to the stator 2 and are supported in spaced relation by a plurality of struts 13 to form an annular inlet passage connecting inlet 4 and the compressor flow passage defined by rotor surface 8 and stator surface 9. A plurality of inlet guide vanes 14 are provided in the inlet passage in order to direct fluid at the proper angle to the first row of moving blades 10, as indicated in Fig. 3.

In order to support vanes 14, inner and outer shroud bands 15, 16 are provided. The inner and outer bands are punched to receive the inner and outer end portions of vanes 14 which project entirely through the bands. Since ice tends to accumulate on the guide vanes under adverse weather conditions, it is desirable to provide means for heating the vanes to prevent such accumulation. This is accomplished in accordance with the invention by providing hollow guide vanes having a passage 17 extending therethrough, as indicated in Fig. 3 and by the broken lines 18, 19 in Figs. 1 and 2. The hollow vanes are secured to bands 15, 16 by welding or in any other desired manner which will not obstruct the flow of fluid through passages 17. The outer end portions of vanes 14 are connected in parallel flow relation by the provision of a U-shaped member 20 secured to band 16 to provide a plurality of radially extending passages as indicated in the drawings. Recessed portions 21, 22 are provided in walls 11, 12, respectively, for locating and securing the vane and band assembly in spaced relation with respect to the first row of moving blades 10.

In order to provide a supply of heated fluid under pressure to passages 17, a conduit 23 connects the vane assembly to the compressor flow path at any suitable location 23a at which the desired fluid pressure level is obtained. Conduit 23 registers with an opening 24 in U-shaped member 20 to provide a continuous flow path from the compressor passage through conduit 23 and passages 17 in the guide vanes.

The rotor shaft 6 is rotatably supported in suitable bearings 25, one of which is shown. In order to minimize thrust load on the bearings resulting from unbalanced forces acting on the compressor rotor in an axial direction, a balance piston or face 7a against which fluid pressure can be directed is formed by the provision of an axially extending peripheral portion 26 of the first rotor disc 7. An axially and radially extending wall portion 27 is secured to wall 11 to form a support for bearing 25 and, in cooperation with band 15, wall portion 27 also assists in forming a pressure chamber 28 containing the balance piston 7a defined by peripheral portion 26. Sealing means 29, 30 which may be of any well-known type are provided to prevent excessive leakage of pressurized fluid through the clearance space between wall portion 27 and shaft 6, and to control the rate at which fluid flows between band 15 and the rotating peripheral portion 26, respectively.

For reasons which will become apparent as the description proceeds, it may be desirable under particularly adverse icing conditions to provide means for connecting pressure chamber 28 to the atmosphere without excessive reduction of the chamber pressure. As illustraded in Figs. 1 and 3, strut 13 and wall 11 are provided with a flow passageway 31 therein. An opening 32, which registers with passageway 31, is provided in wall portion 27 for establishing communication between chamber 28 and passageway 31. A valve 33 for controlling the flow of air through passageway 31 is series connected thereto by conduit 34. Valve 33 is normally closed to prevent any flow through passageway 31.

In operation air is drawn from the atmosphere through annular inlet passage 4 and is compressed by the compressor section 1. The combustion section (not shown) utilizes this compressed air to furnish high temperature motive fluid for the turbine (not shown) which drives the compressor. Air under pressure is conveyed from the compressor to the interior passages 17 of guide vanes 14 through conduit 23. The air passing through the compressor is heated considerably by the compression process and this flow of heated air through the hollow portions of vanes 14 warms the vanes and prevents the accumulation of ice thereon. Since the air enters the compressor through inlet passage 4 at relatively high velocity and at a substantially lower temperature than that of the fluid flowing through passages 17, the combination of these several factors causes hollow vanes 14 to function as an effective heat transfer apparatus, especially if vanes 14 are provided with thin walls. Because of the transfer of heat to the entering air from the heated vanes 14, the air discharged from passages 17 into pressure chamber 28 is cooled to a temperature substantially below the temperature of the air in conduit 23 and thus the first rotor disc 7 is protected against excessive temperature. Normally, the rate at which air is supplied to pressure chamber 28 through conduit 23 and hollow vanes 14 for thrust balancing purposes is great enough to cause sufficient heating of vanes 14 to prevent ice accumulation thereon. Valve 33 is therefore allowed to remain in its normally closed position, and the compressor is protected against icing without the use of additional air for heating purposes over the air normally supplied to the balance piston 7a. Thus, the invention provides adequate de-icing protection to the power plant and at the same time provides effective cooling of the balance piston air for the protection of the first rotor disc without the use of additional heat exchange apparatus and the attendant increase in weight of the power plant and without loss in performance thereof.

Under unusually severe operating conditions, the normal rate of flow of heated air for thrust balancing purposes through the hollow portions of vanes 14 may be inadequate to provide the desired degree of de-icing protection. In such instances the temperature of vanes 14 and hence the effectiveness of the ice prevention apparatus can be increased by opening valve 33, thereby increasing the flow of heated air through the vanes.

Thus, it will be seen that the invention provides anti-icing protection for an aircraft power plant, and at the same time cools pressurized air which is supplied to a compressor balance piston thereby minimizing temperature differentials in the region of the first stage rotor disc without loss in performance of the power plant; and the strength and reliability of certain critical parts are thereby substantially increased without the use of additional heat exchange apparatus.

While a particular embodiment of the invention has been illustrated and described, it will be obvious to those skilled in the art that various changes and modifications may be made without departing from the invention, and it is intended to cover in the appended claims all such changes and modifications that come within the true spirit and scope of the invention.

What I claim as new and desire to seecure by Letters Patent of the United States is:

1. In a gas turbine power plant including a compressor having a bladed rotor, means for preventing ice accumulation at the compressor inlet comprising first walls surrounding an unbladed portion of the rotor and defining therewith a substantially closed chamber, other walls surrounding said chamber defining an annular inlet for conveying fluid to the compressor, a balance piston within said chamber and connected to the rotor, a plurality of hollow vanes extending across said inlet generally in a direction normal to said walls and with the hollow portions of said vanes in communication with said chamber, means for supplying fluid under pressure to said piston including conduit means connected to said hollow portions and to the compressor, and sealing means between said first walls and said rotor for preventing excessive leakage of fluid from said chamber into said annular inlet.

2. In an aircraft power plant, multi-stage air compressor including a stator carrying a plurality of spaced rows of stationary blades and a rotor coaxial therewith and carrying a plurality of rows of moving blades disposed between adjacent rows of stationary blades, said rotor and stator cooperatively arranged to form a flow passage through the compressor, said rotor having an unbladed peripheral portion adjacent the first row of moving blades, first walls substantially enclosing said peripheral portion, other walls defining an annular inlet passage in communication with said flow passage and surrounding said first walls, a plurality of hollow vanes projecting through said first walls and extending across said inlet passage in a direction substantially normal to the direction of flow therein, means for supplying heated air under pressure including conduit means connected to said hollow vanes and to said compressor flow passage, and sealing means between said first walls and the rotor for preventing excessive air leakage from said chamber.

3. In an aircraft power plant, a compressor having a stator carrying a plurality of axially spaced rows of blades and having a rotor coaxial with said stator and carrying a plurality of spaced rows of blades disposed between adjacent rows of stationary blades, said rotor and said stator being cooperatively disposed to form a compressor flow passage, a balance piston secured to the rotor at the upstream side of the first row of rotor blades and rotating coaxially therewith, first walls surrounding said balance piston and forming a substantially closed chamber containing said piston, walls defining an annular inlet passage surrounding said chamber, a plurality of hollow blades extending substantially radially across said inlet and having end portions thereof projecting into said chamber, for supplying fluid under pressure to said balance piston including conduit means connecting the other end portions of said hollow blades to said compressor flow passage at a location between the first and the last row of moving blades, and means for preventing excessive fluid leakage between said first walls and said piston.

4. In a gas turbine power plant including a compressor having a bladed rotor, means for preventing ice accumulation at the compressor inlet comprising first walls surrounding an unbladed portion of the rotor and defining therewith a substantially closed chamber, other walls surrounding said chamber defining an annular inlet for conveying fluid to the compressor, a balance piston within said chamber and connected to the rotor a plurality of hollow vanes extending across said inlet generally in a direction normal to said walls and with the hollow portions of said vanes in communication with said chamber, means for supplying fluid under pressure to said piston including conduit means connected to said hollow portions and to the compressor, sealing means between said first walls and said rotor for preventing excessive leakage of fluid from said chamber into said inlet, and means for changing the rate of fluid flow through the hollow portions of said vanes.

5. In an aircraft power plant, a compressor having a stator carrying a plurality of axially spaced rows of blades and having a rotor coaxial with said stator and carrying a plurality of spaced rows of blades disposed between adjacent rows of stationary blades, said rotor and said stator being cooperatively disposed to form a compressor flow passage, a balance piston secured to the rotor at the upstream side of the first row of rotor blades and rotating coaxially therewith, first walls surrounding said balance piston and forming a substantially closed chamber containing said piston, walls defining an annular inlet passage surrounding said chamber, a plurality of hollow blades extending substantially radially across said inlet and having end portions thereof projecting into said chamber, for supplying fluid under pressure to said balance piston including conduit means connecting the other end portions of said hollow blades to said compressor flow passage at a location between the first and the last row of moving blades, means for preventing excessive fluid leakage between said first walls and said piston, and means for increasing the rate of fluid flow through the hollow blades including conduit means and valve means, said conduit means and said valve means being series connected to said chamber for establishing communication between said chamber and the atmosphere.

6. An axial flow compressor having a casing with at least one row of radially extending hollow vanes therein, a wall interconnecting the inner end of said guide vanes, a diaphragm extending inwardly from said wall, a rotor having at least one row of radially extending blades downstream of said vanes, and means for discharging compressed air from a point within the compressor downstream of said blades into the said vanes, in combination with a chamber defined by the wall, the diaphragm and the upstream end of the rotor, and a connection from said hollow vanes to said chamber to supply air from said vanes to said chamber to maintain a thrust balancing pressure therein.

7. An axial flow compressor having a casing with hollow inlet guide vanes extending substantially radially inwardly therefrom, an annular wall interconnecting the inner end of said guide vanes, a diaphragm extending inwardly from said annular wall, said casing also having rows of stator vanes extending inwardly therefrom and located downstream of said guide vanes, a rotor having rows of blades alternating with the rows of stator vanes, said diaphragm having a bearing therein for the upstream end of said rotor, said rotor having an end wall adjacent to said diaphragm, said annular wall, end wall and diaphragm defining a chamber therebetween, sealing means between said end wall and diaphragm adjacent the bearing, and other sealing means between said annular wall and rotor end wall at a point radially outward of said first sealing means to complete the chamber, and means for discharging into said guide vanes a portion of the compressed air from the compressor, the inner ends of the guide vanes communicating with said chamber.

References Cited in the file of this patent

UNITED STATES PATENTS

| | | |
|---|---|---|
| 2,333,053 | Stroehlen | Oct. 26, 1943 |
| 2,429,681 | Griffith | Oct. 28, 1947 |
| 2,462,600 | Boestad et al. | Feb. 22, 1949 |
| 2,469,375 | Flagle | May 10, 1949 |
| 2,474,068 | Sammons et al. | June 21, 1949 |
| 2,474,258 | Kroon | June 28, 1949 |
| 2,477,798 | Griffith | Aug. 2, 1949 |

FOREIGN PATENTS

| | | |
|---|---|---|
| 619,390 | Great Britain | Mar. 8, 1949 |